(12) United States Patent
Nieves

(10) Patent No.: US 9,530,225 B1
(45) Date of Patent: Dec. 27, 2016

(54) POINT CLOUD DATA PROCESSING FOR SCALABLE COMPRESSION

(71) Applicant: Exelis Inc., McLean, VA (US)

(72) Inventor: Ruben D. Nieves, Ashburn, VA (US)

(73) Assignee: Exelis, Inc., McLean, VA (US)

( * ) Notice: Subject to any disclaimer, the term of this patent is extended or adjusted under 35 U.S.C. 154(b) by 464 days.

(21) Appl. No.: 13/793,280

(22) Filed: Mar. 11, 2013

(51) Int. Cl.
  *G06K 9/00* (2006.01)
  *G06T 9/00* (2006.01)
(52) U.S. Cl.
  CPC .................................... *G06T 9/005* (2013.01)
(58) Field of Classification Search
  None
  See application file for complete search history.

(56) References Cited

U.S. PATENT DOCUMENTS

| | | | | |
|---|---|---|---|---|
| 7,373,473 B2* | 5/2008 | Bukowski | ......... | G06F 17/30241 701/532 |
| 7,804,498 B1* | 9/2010 | Graham | ................ | G06T 11/206 345/419 |
| 7,990,371 B2* | 8/2011 | Bar-Zohar | ............ | G06T 7/0075 345/204 |
| 8,756,085 B1* | 6/2014 | Plummer | ............... | G06Q 40/00 705/4 |
| 2003/0067461 A1* | 4/2003 | Fletcher | .................. | G06T 17/20 345/420 |
| 2003/0214502 A1* | 11/2003 | Park | ...................... | G06T 15/205 345/420 |
| 2005/0033142 A1* | 2/2005 | Madden | ............... | A61B 5/0059 600/407 |
| 2009/0231327 A1* | 9/2009 | Minear | ................. | G06T 11/001 345/419 |
| 2011/0010400 A1 | 1/2011 | Hayes | | |
| 2011/0115783 A1* | 5/2011 | Janson | .................... | G06T 17/00 345/419 |
| 2011/0196661 A1* | 8/2011 | Spicola | ................. | A01K 29/00 703/11 |
| 2011/0202538 A1* | 8/2011 | Salemann | ......... | G06F 17/30241 707/741 |
| 2011/0216063 A1 | 9/2011 | Hayes | | |
| 2012/0114175 A1* | 5/2012 | Hwang | ............. | G06K 9/00208 382/103 |
| 2012/0246166 A1* | 9/2012 | Krishnaswamy | ....... | G06T 17/00 707/741 |

(Continued)

*Primary Examiner* — Tsung-Yin Tsai
(74) *Attorney, Agent, or Firm* — Edell, Shapiro & Finnan LLC

(57) ABSTRACT

A point cloud contains data points having coordinates that locate each data point in a coordinate system. Cell boundaries are defined in the point cloud and a unique index is assigned to each cell. The indexes of the cells are assigned to any of data point contained in a cell having the same index. The index data points can be accessed in a manner analogous to rasterized or gridded data while maintaining the arbitrary or random distribution associated with point clouds. The indexed point cloud can be further processed to achieve a scalable compression level, either losslessly by increasing redundancy in the point cloud data and/or by separating the point cloud data into relevancy bands, or by conventional lossy techniques, such as by exploiting the redundancies created in the point cloud data to represent the point cloud in a finite number of symbols.

21 Claims, 14 Drawing Sheets

(56) References Cited

U.S. PATENT DOCUMENTS

| | | | |
|---|---|---|---|
| 2012/0256916 A1* | 10/2012 | Kitamura | G01S 17/89 345/419 |
| 2013/0016913 A1* | 1/2013 | Pham | G06T 7/0042 382/197 |
| 2013/0321393 A1* | 12/2013 | Winder | G06T 15/04 345/419 |
| 2014/0098094 A1* | 4/2014 | Neumann | G06K 9/00214 345/420 |

* cited by examiner

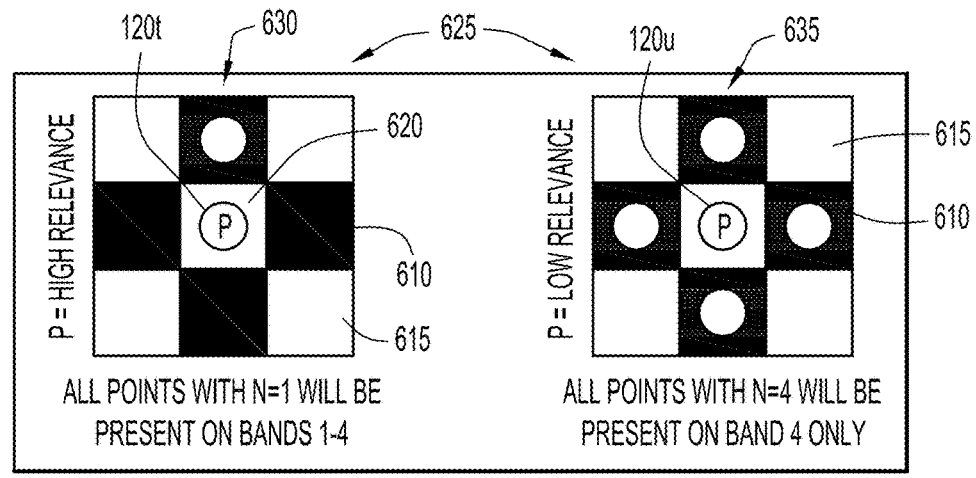
FIG.6B
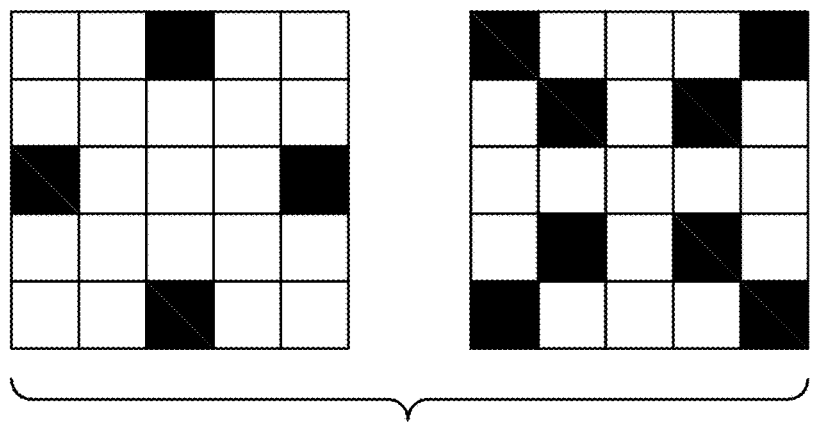
FIG.6C

POINT CLOUD DATA PROCESSING FOR SCALABLE COMPRESSION

TECHNICAL FIELD

The present disclosure relates to processing of arbitrarily distributed data for compression.

BACKGROUND

A point cloud is a data structure made up of a typically large set of point data, each descriptive of a point in three-dimensional space. Typically, points in a point cloud are arbitrarily distributed or seemingly random, i.e., are not distributed in a regular pattern. Thus, while point clouds can be directly rendered as an image of a collection of dots, point clouds do not lend themselves to image processing and/or other data manipulation techniques without first being modeled as a three-dimensional surface. When so modeled, the resulting structure is no longer a point cloud, per se, and suffers non-trivial data loss.

Generally, lossless data compression exploits redundancies by identifying and removing redundant data. Lossy compression identifies and removes insignificant or unimportant data to decrease the amount of data. Data compression of point clouds presents many challenges to the signal processing community. Very few effective compression techniques have been developed for point cloud data that preserve both the numerical and geometrical aspects of arbitrarily distributed three-dimensional data.

One point cloud compression technique transforms the point cloud into a network of different levels of triangles, each level being created by dividing the triangles of a prior level into smaller triangles. A bit plane encoder is used to generate bit planes from the layers of triangles, the collection of which realizes the compressed point cloud. One drawback of such a technique is that point cloud must first be modeled as a surface; the original point cloud data is essentially lost. Once decompressed, the modeled surface data is prone to artifacts that can lead to misleading or false features, e.g., edge information.

Another technique attempts to leverage the sweeping nature of light detection and ranging (LIDAR) by forming tuples from several dimensions that characterize the point cloud. For example, such tuples may include an ordinal reference that is indicative of the order in which the data of the tuple were collected, locations detected (x, y, and z), time, intensity, the number of reflected signals that return, the numerical reference of a particular reflected signal that returns, and so on. A sequence of vectors composed of the dimensions contained in the tuples is formed and a time series is generated from the vectors from the measured time at successive periods and spaced at relatively uniform time intervals. Wavelet analysis and transformation is performed on the time sequence of vectors to produce the compressed point cloud. This technique relies heavily on the assumption that the data channels are interrelated or correlated, and that this relationship can be modeled by a mathematical equation. For the cases in which such relationship doesn't exist, only a marginal compression can be expected. Moreover, this technique relies on the manner in which the data were acquired, e.g., the scene scanning patterns utilized during collection, and is thus both platform and mission dependent, as opposed to being applicable to point clouds in general. Moreover, applying a fixed mathematical model or equation to define such an interrelationship introduces approximation errors, which are inherent to data fitting algorithms in general.

There is thus an apparent need for point cloud processing that provides reasonable compression rates while retaining the original point cloud structure.

SUMMARY

A point cloud contains data points having coordinates that locate each data point in a coordinate system according to an arbitrary or random distribution. Cell boundaries are defined in the point cloud and a unique index is assigned to each cell. The indexes of the cells are assigned to any data point contained in a cell having the same index. The coordinates of an indexed data point can be mapped to coordinates of a local coordinate system defined in the cell having the same index as the data point thereby reducing the numerical range of data. The range reduced point data allow the point cloud data to be represented by a set of symbols corresponding to coordinates that are approximately the same distance from the origin of the local coordinate system. Additionally, the index data points can be accessed in a manner analogous to rasterized or gridded data, making index-based processing, e.g., conventional image processing techniques, possible while maintaining the original arbitrary or random distribution associated with the point cloud.

BRIEF DESCRIPTION OF THE DRAWINGS

FIGS. 6A-6C are illustrations of point cloud data analysis masks by which sub-band decomposition (SBD) can be performed in embodiments of the present general inventive concept.

DESCRIPTION OF EXAMPLE EMBODIMENTS

Figure 1:
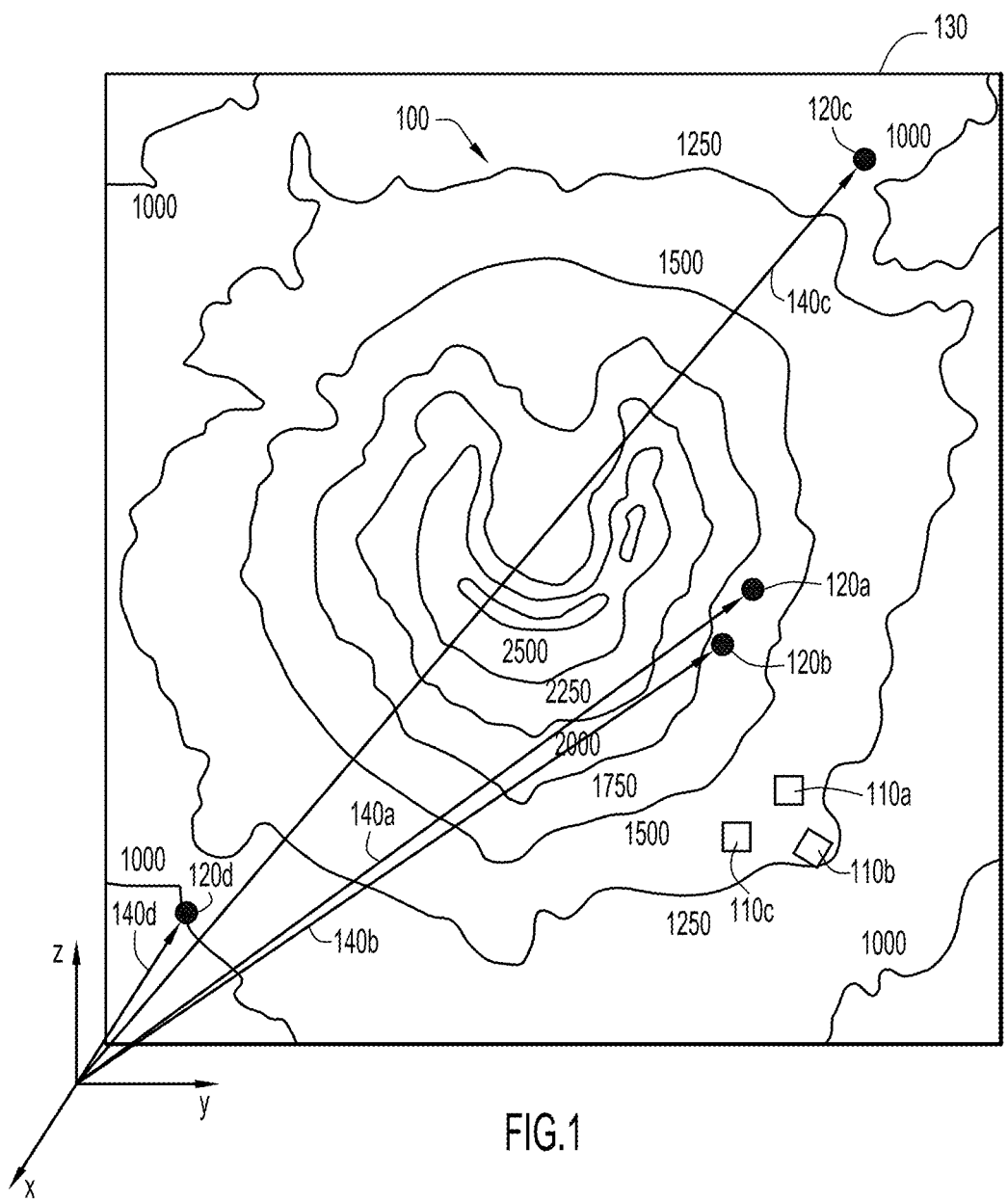
FIG. 1 is a conceptual diagram of a point cloud data set.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

The word exemplary is used herein to mean, "serving as an example, instance or illustration." Any embodiment of construction, process, design, technique, etc., designated herein as exemplary is not necessarily to be construed as being preferred or advantageous over other such embodiments.

Additionally, mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

FIG. 1 is a conceptual diagram of a point cloud data set 100, or simply point cloud 100, comprising a plurality of data points 120a-120u (some of which are illustrated in other figures), representatively referred to herein as data point(s) 120. Point cloud 100 may have been acquired through light detection and ranging (LIDAR) scanning, such as by an aircraft in the case of terrain scanning, however the present invention is not so limited. That is, data points 120 may contain information specific to the particular context from which the data were obtained. In the examples described herein, point cloud 100 contains geographic data relating to a scene 130, i.e., a bounded region in space containing terrain and man-made structures, representatively illustrated as structures 110a-110c and representatively referred to herein as structure(s) 110. Each point 120 may be represented in a data structure, $$p_n = (\lambda_n, \phi_n, h_n), \quad (1)$$

where $\lambda_n$ is the longitude and $\phi_n$ is the latitude in scene 130 at which the $n^{th}$ data point was sampled by LIDAR and $h_n$ is the elevation measured by the LIDAR at that location. It is to be understood, however, that the present invention is limited neither to the source of data set 100 nor to its composition.

The ordinarily skilled artisan will recognize and appreciate that point cloud 100 may comprise millions if not billions of data points 120 that are arbitrarily or randomly distributed, i.e., void of a regular pattern such as that established in rasterized data. Ultimately, point cloud 100 may be used to render a three-dimensional representation of scene 103, e.g., an image. In certain applications, image processing techniques, e.g., filtering, edge detection, etc., may be employed to identify objects of particular interest, e.g., structures 110a-110d, representatively illustrated as structure(s) 110. Accordingly, any data compression performed on point cloud 100 must minimize compression artifacts that would interfere with such processing after the data are restored to the uncompressed state.

As illustrated in FIG. 1, the geographical coordinates of each data point 120 is referenced from an origin specified for the geographical coordinate for which the present invention is implemented. For example, data points 120 may be identified by latitude and longitude with reference to the intersection of the Prime Meridian and the Equator and elevation with reference sea level. In the Universal Transverse Mercator (UTM) system, each data point may be identified by a number of meters of northing and easting with reference to the intersection of the International Date Line and the Equator. Elevation in a UTM based coordinate system may also be references with respect to sea level. Thus, the location of any data point 120 in scene 103 can be characterized by a location vector, representatively illustrated at location vectors 140a-140d and representatively referred to herein as location vector(s) 140.

Figure 2:
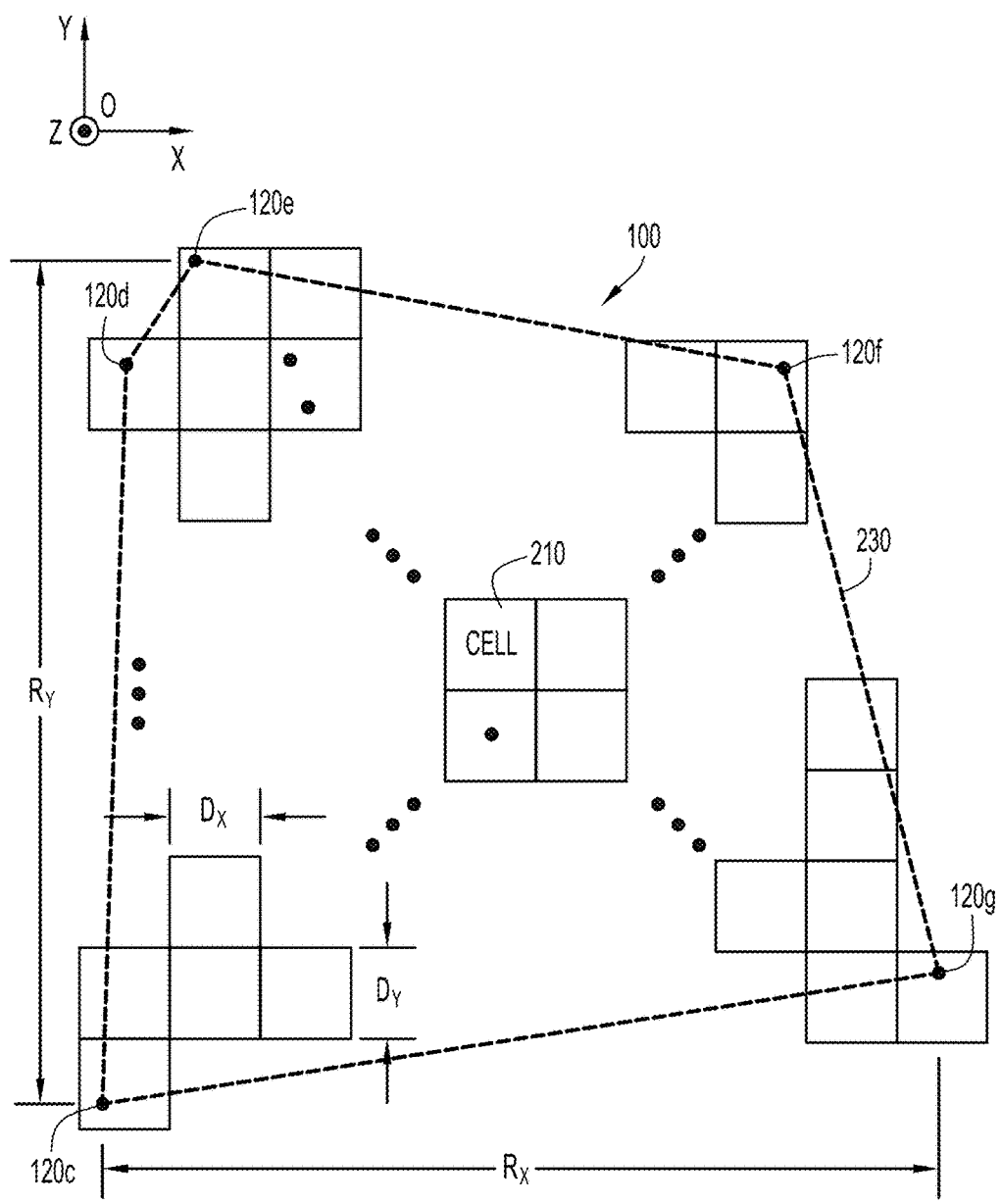
FIG. 2 is another diagrammatic representation of a point cloud for explaining multidimensional reference gridding (MRG) embodied in the present general inventive concept.

FIG. 2 is another diagrammatic representation of point cloud 100 by which multidimensional reference gridding (MRG) is explained. MRG indexes data points 120 in point cloud 100 so that grid-oriented or raster data processing techniques can be performed while maintaining the original arbitrary distribution of the point cloud data. It is to be understood that while MRG will be described with reference to the two-dimensional diagram illustrated in FIG. 2, the example embodiment described is performed in three dimensions, with longitude being represented along the x-axis, latitude being represented along the y-axis and elevation represented along the z-axis, or orthogonal to the drawing sheet.

MRG may begin by determining the dimensional extent of point cloud 100, i.e., the minimum volume that contains all data points 120 in point cloud 100. It is to be assumed, for explanation purposes, that all data points 120 in point cloud 100 are arbitrarily distributed over and contained within a closed volume, representatively illustrated as region 230, again recognizing that region 230 is actually three-dimensional. The extent of region 230 may be determined through an analysis of point cloud 100 that is suitable for finding extrema in data. Example extrema are representatively illustrated in FIG. 2 as data points 120c-120g. From the extrema, dimensions of region 230 are found by, for example, subtracting the minimum coordinate in each direction from the corresponding maximum coordinate, thereby defining a volume $R_x \times R_y \times R_z$ ($R_z$ not being illustrated).

MRG indexes data points 120 by defining data cells 210, or simply cells 210, of a specified size. In certain embodiments, the size of cells 210 is a user-assignable variable that can be selected per compression objectives; larger cells provide higher compression rates, while smaller cells result in finer resolution and, accordingly, more accurate reconstructions. The ability of indexing a point or group of points without changing the actual value of the data point allows the reconstruction or decompression of specific regions of interest in a point cloud, as it defines correspondences between geographical location and cell indexes. The ability to isolate groups of data points based on their indexes allows decompression algorithms to confine their processing to a subset of the data, thus implementing an added dimension of scalability on LIDAR compression/decompression.

The total number of cells required to fill region 230 may be obtained by dividing the $R_x \times R_y \times R_z$ point cloud volume by the specified cell size, $$[NC_x \ NC_y \ NC_z] = \left[ \mathrm{int}\!\left(\frac{R_x}{D_x}\right) \ \mathrm{int}\!\left(\frac{R_y}{D_y}\right) \ \mathrm{int}\!\left(\frac{R_z}{D_z}\right) \right], \qquad (2)$$

where $NC_x$, $NC_y$ and $NC_z$ are the total number of cells along each spatial axis, Dx, Dy and Dz are the dimensions of cells 210 and int(Λ) returns the integer part of Λ, such as through a floor operation [Λ], which returns the largest integer smaller than Λ, a ceiling operation [Λ], which returns the smallest integer larger than Λ or through other computations by which the integer part of a floating point number can be extracted. Each coordinate in point cloud 100 may then be divided by the specified cell size, e.g., $$\tilde{p}_n = \left(\frac{\lambda_n}{Dx}, \frac{\phi_n}{Dy}, \frac{h_n}{Dz}\right) = (x_n, y_n, z_n) = (i_n \cdot dx_n, \ j_n \cdot dy_n, \ k_n \cdot dz_n). \qquad (3)$$

The resulting data point representation $\tilde{p}_n$ specifies Cartesian coordinates having respective integer $i_n$, $j_n$ and $k_n$, and fractional parts $dx_n$, $dy_n$, and $dz_n$. In accordance with MRG, the integer parts $i_n$, $j_n$ and $k_n$ may be used as a three-dimensional cell index $[i \ j \ k]_n$ that identifies the cell 210 in which data point $\tilde{p}_n$ is contained. It is to be noted that no appreciable error is introduced in the point cloud data by the conversion of Eq. (3); the original exact values of all of the coordinates of all of the data points 120 in point cloud 100 are preserved.

MRG cell indexing affords the ability to perform index-based processing techniques analogous to those used on rasterized images, while preserving the non-gridded arbitrary distribution of point cloud 100. In certain embodiments, a suitable programming paradigm may be implemented, such as by modification to memory access routines, by which the cell and its contents are the smallest data unit to be processed in a manner analogous to a pixel. When the present invention is so embodied, cell indexes $[i \ j \ k]_n$ may be increased or decreased in unit increments from, for example, one (1) through $NC_x$, $NC_y$, and $NC_z$, respectively, i.e., $i_n \in [1, NC_x]$, $j_n \in [1, NC_y]$, $k_n \in [1, NC_z]$, and $n \in [1, NC_y * NC_y * NC_z]$ and, at each iteration, any data processing operation on the cell can be applied across all points sharing the same cell index, in whatever order the points reside in memory.

Figure 3:
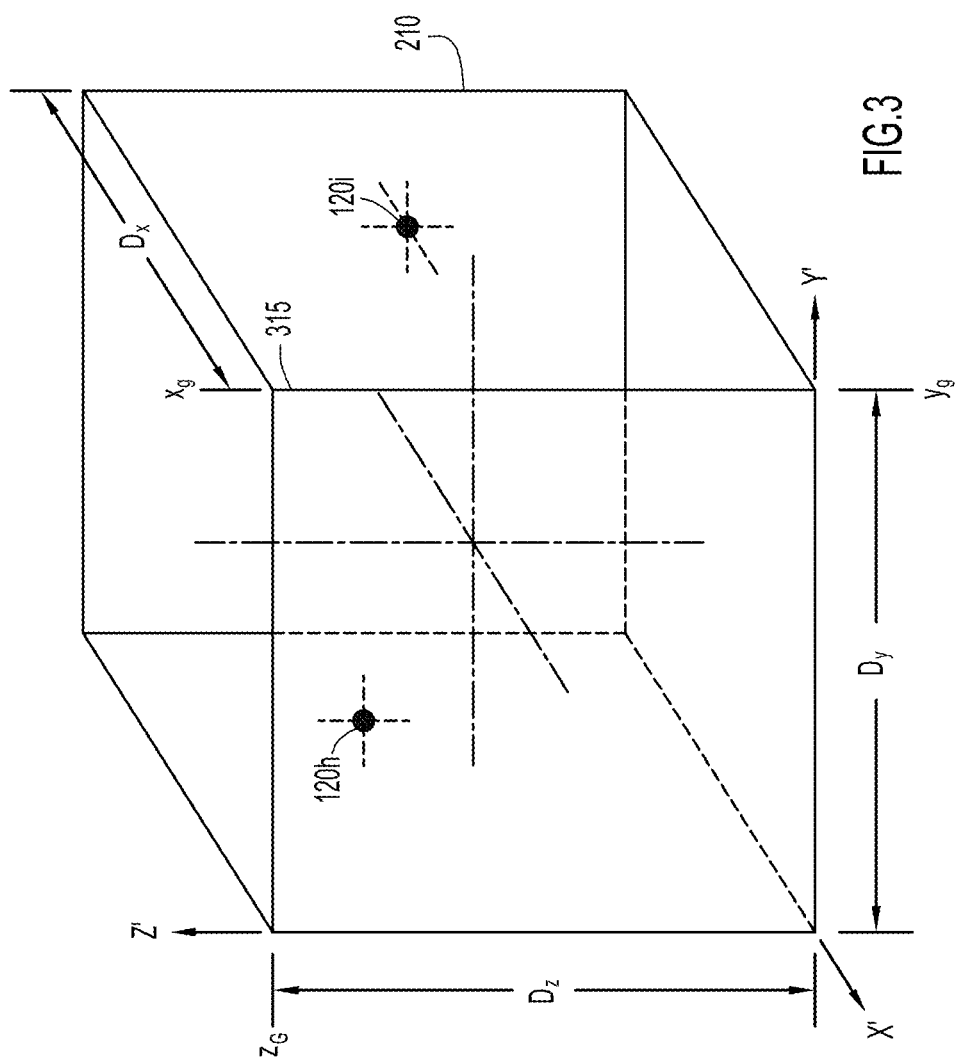
FIG. 3 is a diagram of a data cell by which an exemplary MRG scheme is explained in accordance with the present general inventive concept.

FIG. 3 is a diagram of a cell 210 by which an exemplary MRG scheme is further explained. Cell 210 is a Dx×Dy×Dz rectangular cuboid, although other cell constructions may be used in conjunction with the present invention without departing from the spirit and intended scope thereof. For purposes of explanation, it is to be assumed that an $m^{th}$ data point, such as one of data point 120h or 120i, specifies coordinates $(x_m, y_m, z_m)$ per Eq. (3) and the data point index is identified as, $$[i_m j_m k_m] = [\mathrm{int}(x_m) \mathrm{int}(y_m) \mathrm{int}(z_m)]. \qquad (4)$$

The boundaries of the $m^{th}$ cell 210 may be determined when needed by multiplying the index of the cell by the cell dimensions, e.g., $$p_G = (x_G, y_G, z_G)_m = (i_m \cdot D_x, j_m \cdot D_y, k_m \cdot D_z), m \in [1, NC_x \cdot NC_y \cdot NC_z], \qquad (5)$$

where $p_G$ is a vertex furthest from the origin on the $m^{th}$ cell boundary, representatively illustrated at vertex 315 illustrated in FIG. 3, having coordinates $x_G$, $y_G$ and $z_G$.

A consequence of MRG is that the index of any data point in a particular cell, i.e., in the range $(x_G-Dx) < x \le x_G$, $(y_G-Dy) < y \le y_G$ and $(z_G-Dz) < z \le z_G$, is the same. That is, more than one data point 120 can be contained by a particular cell 210 and share the same index. Accordingly, analogously to a pixel, specifying a cell by index translates to the specification of all points in the indexed cell and any processing operation directed to the indexed cell is applied across all points of that cell. The cell index provided by MRG thus affords index-based processing techniques analogous to those used on rasterized images while preserving the non-gridded arbitrary distribution of point cloud 100.

Figure 4:
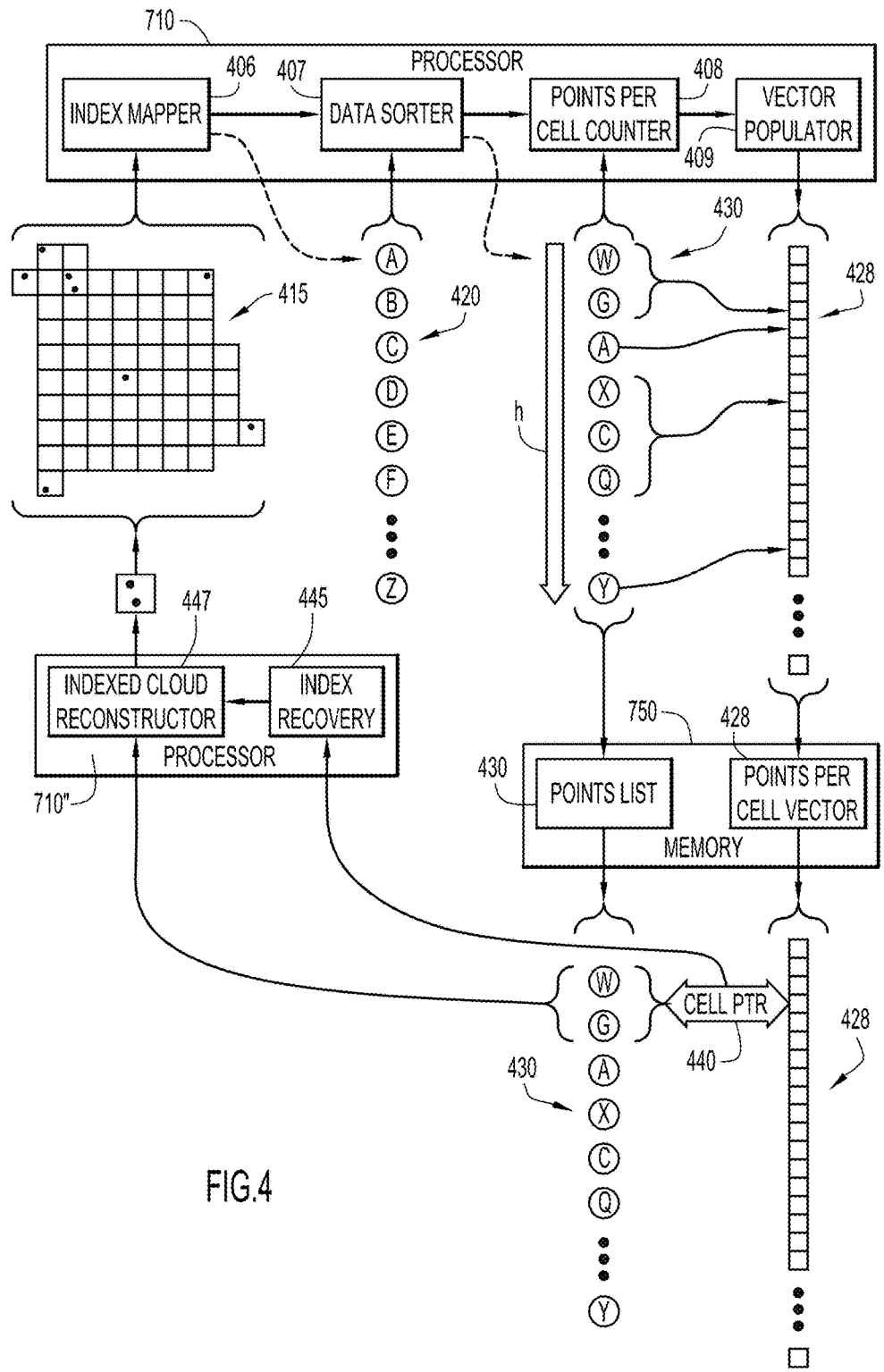
FIG. 4 is a diagram illustrating an example index transformation technique for implementation in embodiments of the present general inventive concept.

Once MRG has indexed data points 120 in point cloud 100, scalable compression may be achieved on the point cloud by the application of one or more data processing techniques. For example, the cell indexes are derived directly from point cloud data and, as such, the index values themselves can be significantly large, as can the range of values across the point cloud. Accordingly, a large number of symbols may be needed to represent the entire point cloud. In certain embodiments of the present invention, these issues are ameliorated and additional scalability is achieved in point cloud compression by index transformation, such as that illustrated in FIG. 4. The three-dimensional cell indexes i, j, k generated on the point cloud by MRG, representatively illustrated at data set 415, may be mapped to a one dimensional index h by an index mapper process 406 executing on a processor 710, such as by:

$$h_n = NC_x * NC_y * (k_n - 1) + NC_y * (i_n - 1) + j_n. \qquad (6)$$

The linearly indexed points, representatively illustrated at data set 420, may then be sorted by index h, such as by data sorting process 407, so that the points are ordered in linearly-increasing index order from smallest to largest index. The sorted points, representatively illustrated at data set 430, are counted, such as by points-per-cell counting process 408, and the number of points in each cell are stored in a vector 428 by a vector populating process 409. In certain embodiments, points-per-cell counting is performed during the three-dimensional indexing operation of MRG, where a three-dimensional accumulator (not illustrated) may be established to track of the number of points sharing the same cell index. Vector 428 is allocated to have one storage location for every possible value of index h, i.e., $\forall h \in [1, \ldots, NC_x * NC_y * NC_z]$, where a zero (0) is stored at the h-indexed location in vector 428 for any empty cell. The h-ordered data set 430 and points-per-cell vector 428 may be stored in memory 750.

By way of this index transformation, storage of cell indexes is not required, as they are implicit in the order of the points list 430. The notion of cells is lost in points list 430, as there is no structure, flags or indicators as to where a cell starts or ends. To recover the cell correspondence, a cell pointer 440 is used to couple the x, y and z point data contained in points list 430 with the number of points in each linearly-indexed cell per the point-per-cell vector 428. For example, cell pointer 440 may be used to successively address in h-indexed order each storage location of points-per-cell vector 428. For each non-zero value in vector 428, the corresponding number of points in points list 430 is assigned to a three-dimensional cell by indexed cloud reconstruction process 447 executing on processor 710' (the prime indicating that the reconstructing processor need not be the same processor 710 that originally performed the index transformation), and the three-dimensional cell index for that cell is recovered by index recovery process 445. Index recovery process 445 may perform the following operations to recover the three-dimensional index values i, j and k:

$$k_{CPtr} = \left\lceil \frac{CPtr}{NC_x * NC_y} \right\rceil, \quad (7)$$

$$R = \mathrm{mod}\left(\frac{CPtr}{NC_x * NC_y}\right), \quad (8)$$

$$j_{CPtr} = \mathrm{mod}\left(\frac{R}{NC_y}\right), \text{ and} \quad (9)$$

$$i_{CPtr} = \left\lceil \frac{R}{NC_y} \right\rceil \quad (10)$$

where CPtr is the value of cell pointer 440 in the current processing iteration. The skilled artisan will appreciate that by the foregoing index transformation technique, only the number of points per cell need be retained, as opposed to the cell indexes, which tend to be small and redundant, and thus compress very efficiently.

Another technique by which point cloud compression can be additionally scaled is referred to herein as a sub-regional distance transform (SDRT) process. SDRT maps data points 120 onto a local coordinate system defined in each cell 210 to reduce the numerical range of the point cloud data. The ordinarily skilled artisan will recall that essentially all useful lossless compression techniques achieve data reduction by exploiting data redundancy. Higher data redundancy affords higher compression ratios. However, in point cloud data and especially with LIDAR terrain point cloud data, the symbols or numerical values carried in the data sets represent coordinates in the scene and more spatial coverage by the LIDAR scans leads to more data points 120 spread over a wider area. Such wide spatial coverage leads to a larger range of coordinates representing the scene 130, leading to the necessity of having a larger set of symbols for compression. Referring once again to FIG. 1, such a range of data is observed in the relative magnitudes of vectors 140c and 140d. The ordinarily skilled artisan will appreciate that such a large numerical range is an impediment to efficient compression. SDRT reduces the numerical range in the point cloud data so as to generate redundancy therein.

Figure 5:
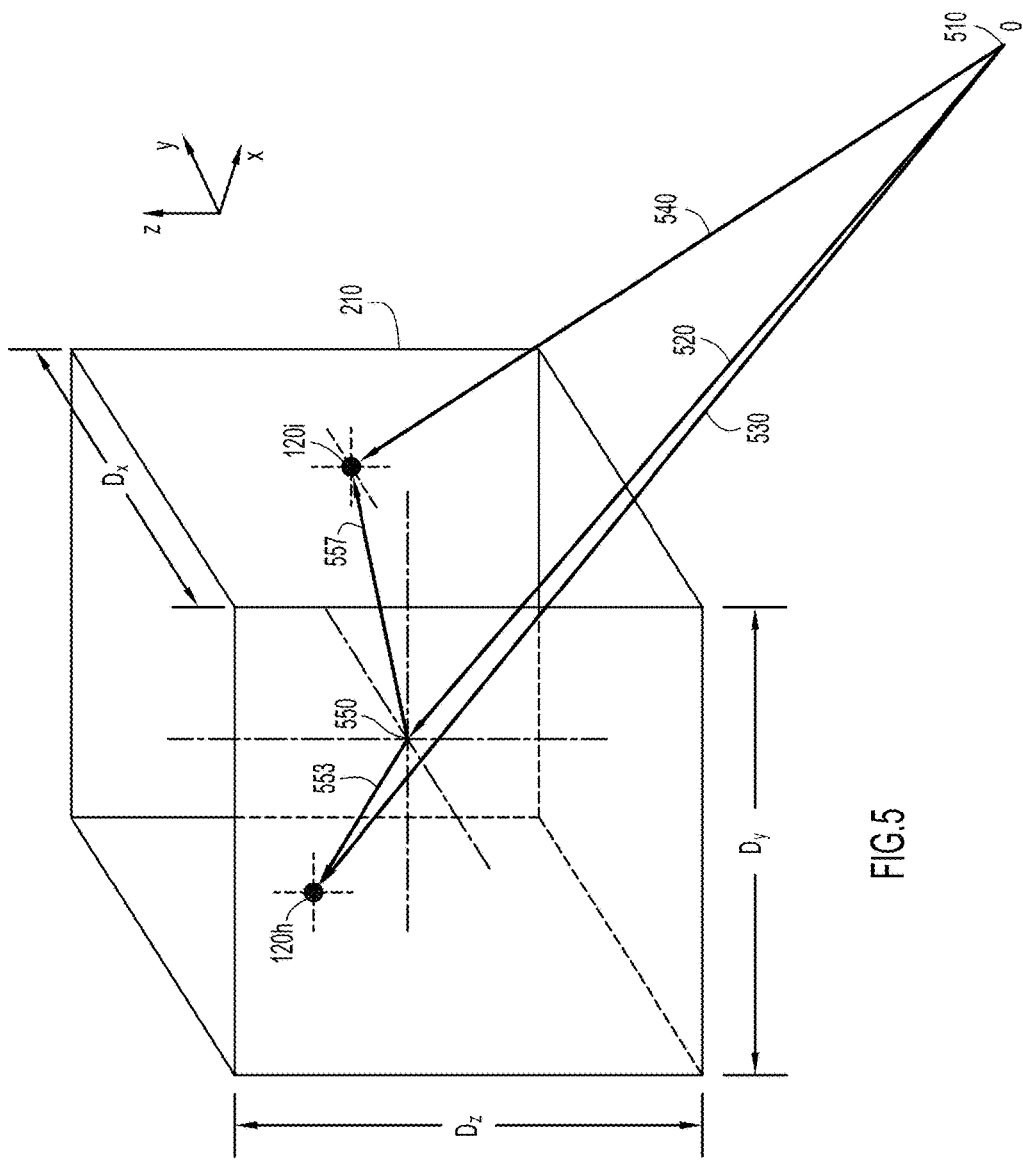
FIG. 5 is a diagram of the same cell illustrated in FIG. 3 to explain an exemplary sub-regional distance transform (SRDT) embodied in the present general inventive concept.

FIG. 5 is a diagram of the same cell 210 illustrated in FIG. 3, which will be used to explain an exemplary SRDT technique. In certain embodiments, SDRT begins by first computing the center 550 of each cell 210. In certain embodiments, the maximum spatial boundaries $x_G$, $y_G$ and $z_G$ of $n^{th}$ cell 210 can be obtained through the operation illustrated by Eq. (2), i.e., by multiplying the three-dimensional cell size in each direction, i.e., Dx, Dy and Dz by the cell index, $[i\ j\ k]_n$. The geographical center of the $n^{th}$ cell can be obtained by subtracting half of the defined cell size from the maximum boundary in each of the three-dimensions, e.g., $$[x_C\ y_C\ z_C]_n = \left[x_G - \frac{Dx}{2}\ y_G - \frac{Dy}{2}\ z_G - \frac{Dz}{2}\right]_n. \quad (11)$$

This geographical center can be represented as vector from the origin 510, such as is illustrated as vector 520 in FIG. 5. SRDT proceeds by subtracting the previously computed geographical center coordinate from all the points that are encompassed by that particular cell, i.e., from all of the points that share the same index. This is illustrated by the vector subtraction of the center vector 520 and the location vectors 530 and 540 of data points 120h and 120i, respectively. This operation of SDRT acts to project data points 120 in point cloud 100, as referenced by location vectors 140, onto a local coordinate system, as referenced by local location vectors 553 and 557 referenced from a local origin 550 at the center of an indexed cell 210. SDRT is linear and completely reversible when the minimum and maximum coordinates of the point cloud and the selected cell size used in the transformation are known. Additionally, there is no quantization or approximation error in SDRT, which means that an exact reconstruction of the original dataset can be obtained.

The representation of the point cloud 100 produced by SDRT comprises locally referenced data points 120 that are a corresponding distance from the local origin, i.e., the center of the encompassing cell, ranging from positive to negative half-cell-size values. Accordingly, the entire point cloud 100 can be represented with a fewer number of range values regardless of the spatial extent of point cloud 100. The bounds on the distance values, i.e., a zero vector to maximum local location vector magnitude of approximately one-half the cell size, is referred to herein as range reduction and is dictated by the decimal precision of original point cloud 100. Range reduction increases data redundancy in that the entire point cloud 100 can be represented by a limited set of possible distances from the origin of the local coordinate systems.

Compression of point cloud data is made further scalable by a technique referred to herein as sub-band decomposition (SBD). SBD performs spatial high-pass/low-pass filtering combined with a downsampling process, using the indexed data provided by MRG. For example, SBD may assign a relevance score to each data point 120 in point cloud 100 based on the density of its neighborhood. Data points 120 corresponding to edges, such as the edges of buildings, or small features in the scene, such as power lines, are expected to have fewer neighbors and may thus be assigned a relatively high relevance score. Conversely, objects with a denser neighborhood will be assigned a relatively low relevance score. Establishing thresholds can separate the data into corresponding data bands, each having higher or lower point cloud density. Lower density bands contain high-pass data points by which edges can be detected with a high degree of object resolvability. The spacing between points of denser surfaces in the high pass data band may be increased relative to the original point cloud (resolution reduction), but point spacing is not critical in analyses relying on edge features in scene 130.

Figure 6A:
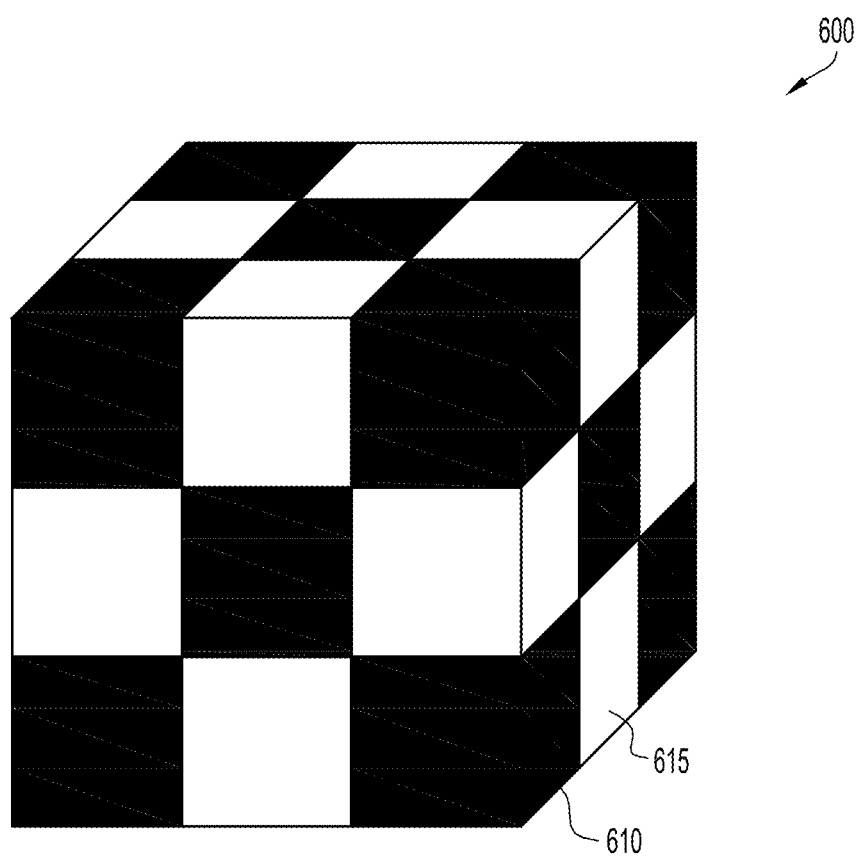

In certain embodiments, SBD utilizes three-dimensional binary masks that establish the content of different data bands. One such mask 600 is illustrated in FIG. 6A and comprises one or more count cells 610, one or more ignore cells 615 and a scrutiny cell 620, which is illustrated in FIG. 6B. When a data point 120 is in a count cell 610, it is added to the number of data points that are neighbors of the data point 120 in the scrutiny cell 620. Any data point 120 in an ignore cell 615 is not considered in the neighborhood analysis, which is described with reference to FIG. 6B.

The mask 625 in FIG. 6B is illustrated as a two-dimensional mask solely for purposes of explanation. The ordinarily skilled artisan will recognize and appreciate the use of a three-dimensional mask, such as mask 600, from the description of the two-dimensional case. When mask 625 is in position 630 within the point cloud 100, the number of neighboring data points 120 to data point 120t in the scrutiny cell 620 is one (1). This condition indicates a region in the point cloud 100 that is potentially of high significance, such as lying on an edge of a structure in the scene. Accordingly, data point 120t is included on all data bands, which in the embodiment of FIG. 6B, includes bands 1-4. When mask 625 is in a position 635 within the point cloud 100, the number of neighboring data points 120 to data point 120$u$ in the scrutiny cell 620 is four (4). This indicates a region in point cloud 100 where data points 120 contain substantially similar data and, as such, data point 120$u$ offers little in additional analytical value. Accordingly, data point 120$u$ is contained only on data band four (4).

SBD applies mask 600 to every point in point cloud 100 and counts the number of data points in the neighborhood of the data point in the scrutiny cell. When the number of neighboring points meets a specified threshold condition, the data point is moved from the original point cloud 100 to a data structure containing data points of the data band for which the threshold condition is specified. Any data point that is relocated in memory remains associated with its original cell index, which will facilitate lossless reconstruction.

FIG. 6B considers the case of 4 bands, band 1 will be the most significant band, e.g., consisting mostly of the points belonging to edges as well as sparse representations of surfaces. On the other hand, band 4 will only contain points that were originally surrounded by multiple neighbors. Perfect reconstruction happens when bands 1 through 4 are combined or simultaneously loaded to a viewer, but increasingly higher levels of detail can be obtained by requesting increasingly higher number of bands.

The present invention is not limited to a particular mask configuration; many different configurations may be used in conjunction with the present invention without departing from the spirit and intended scope thereof. Examples of such other configurations are illustrated in FIG. 6C.

Figure 7:
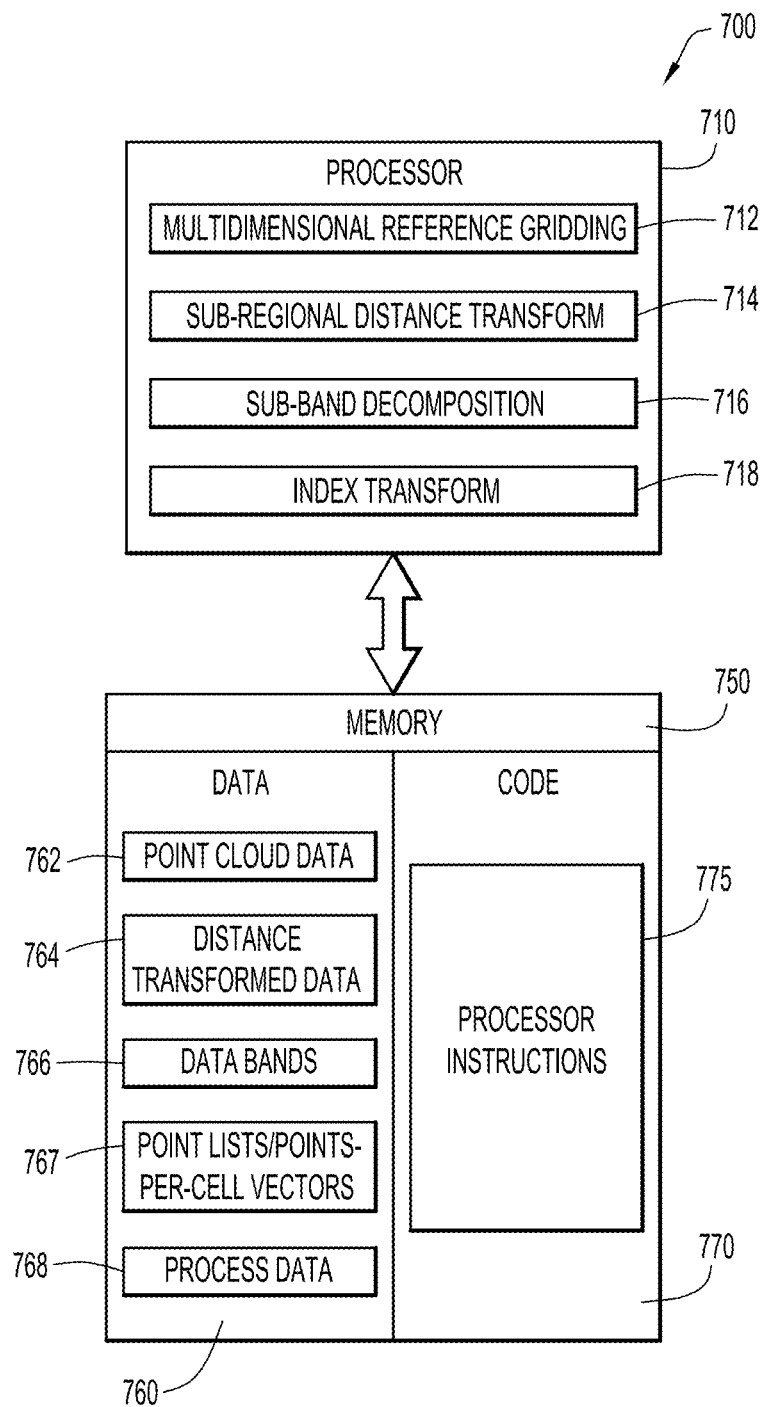
FIG. 7 is a schematic block diagram of a processing system on which the present general inventive concept may be embodied.

FIG. 7 is a schematic block diagram of an exemplary data processing system 700 by which the present invention can be embodied. Processing system 700 may include a processor 710 and a memory 750. The present invention is not limited to any particular hardware configuration or instruction set architecture of the processor 710, which may be configured by numerous structures that perform equivalently to those illustrated and described herein. Moreover, it is to be understood that while the processor 710 is illustrated as a single component, certain embodiments of the invention may include distributed processing implementations by multiple processing elements. Memory 750 may include memory that is distributed across components, to include, among others, cache memory and pipeline memory, as well as portable memory, such as compact discs, digital versatile discs, portable flash memory, etc. The present invention is intended to embrace all such alternative implementations, and others that will be apparent to the skilled artisan upon review of this disclosure.

Memory 750 may be utilized to store data and processing instructions on behalf of the exemplary data processing system 700. Memory 750 may include multiple segments, such as a code memory segment 770 to maintain processor instructions 775 for execution by processor 700, and data memory 760 to store data, such as data structures on which the processor 710 performs data manipulation operations. Such data structures are stored in various memory locations to include point cloud data location 762, in which the original point cloud data are stored, distance transformed data location 764, in which data mapped onto cellular-local coordinate systems are stored, data bands location 766, in which points belonging to different bands are identified, point lists and points-per-cell vector storage location 767 in which point lists and points-per-cell vectors are stored, and process data location 768, in which parameters, e.g., cell size, masks and other such data are stored. Processor instructions 775 may include instructions that, when executed by processor 710, compels execution of any or all of MRG process 712, SRDT process 714, SBD process 716 and index transformation process 718.

Figure 8:
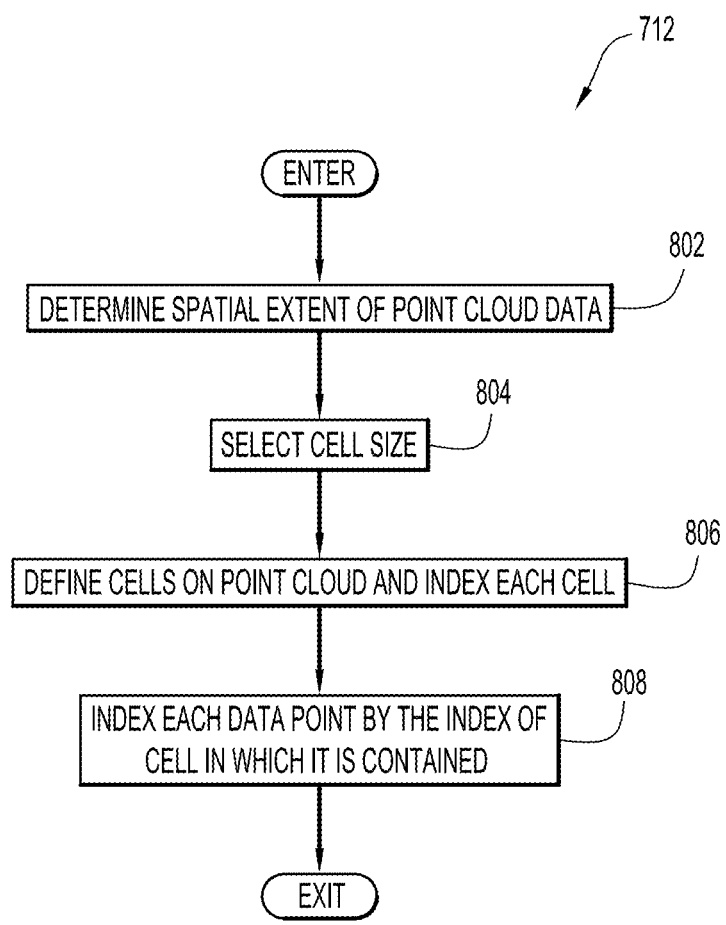
FIG. 8 is a flow diagram of an exemplary MRG process for implementation in embodiments of the present general inventive concept.

FIG. 8 is a flow diagram of an exemplary MRG process 712 for implementation in embodiments of the present invention. In operation 802, the spatial extent of the point cloud is determined such as by subtracting the minimum coordinate on each spatial axis from the corresponding maximum coordinate. In operation 804, a cell size is selected and cells of the selected cell size are established in the point cloud data in operation 806. In operation 808, each data point in the point cloud is indexed to correspond with the index of the cell in which it is contained. This can be achieved by dividing the coordinates of the data points by the cell size. Additionally, a data point on an edge or vertex of each cell can be obtained by multiplying the cell size by the desired cell index.

Figure 9:
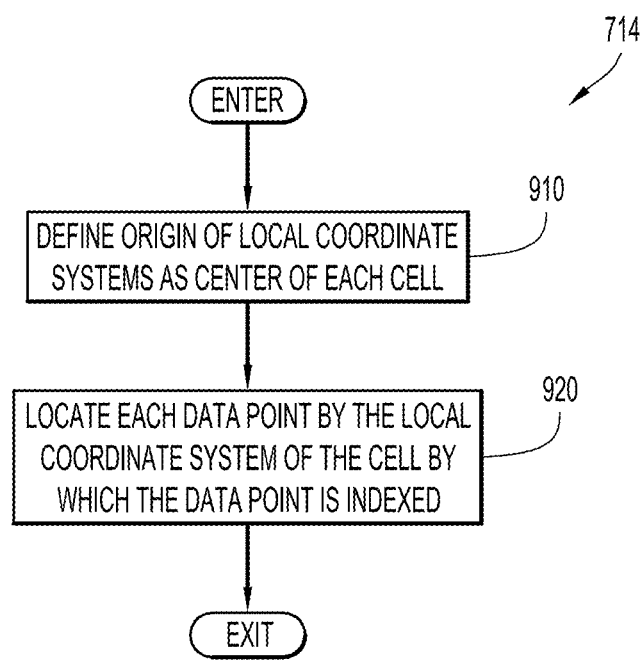
FIG. 9 is a flow diagram of an exemplary SRDT process for implementation in embodiments of the present general inventive concept.

FIG. 9 is a flow diagram of an exemplary SRDT process 714 for implementation in embodiments of the present invention. In operation 910, local coordinate systems are established at the center of the respective cells and, in operation 920, each data point is mapped to the local coordinate system of the cell in which it is indexed. Such mapping may generate local location vectors, i.e., three-dimensional coordinated of the point referenced from the origin of the local coordinate system of the containing cell.

Figure 10:
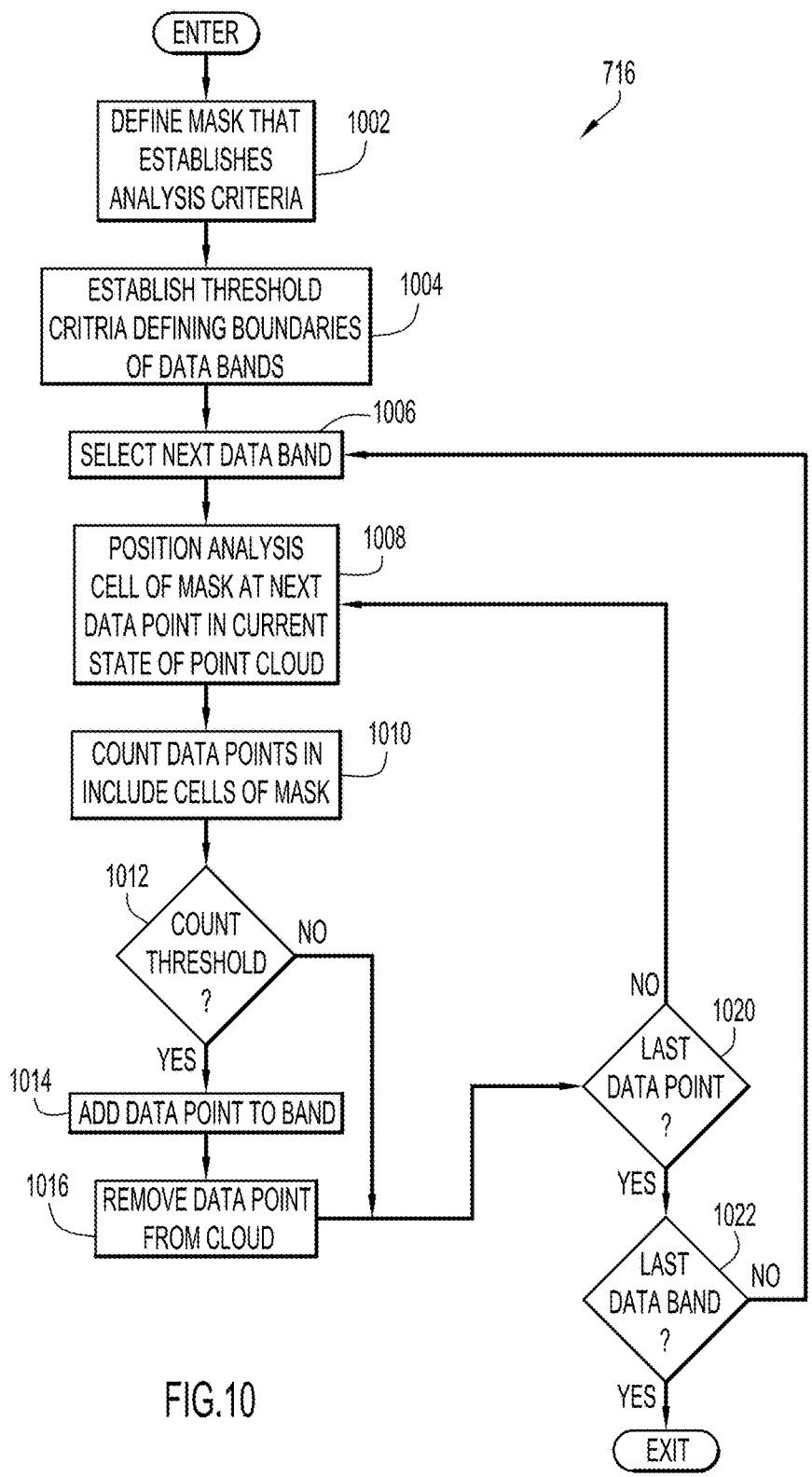
FIG. 10 is a flow diagram of an exemplary SBD process to provide additional compression scalability in embodiments of the present general inventive concept.

FIG. 10 is a flow diagram of an exemplary SBD process 716 for implementation in embodiments of the present invention. In operation 1002, a mask is defined that establishes analysis criteria, such as a decision based on the number of data points in neighboring cells. In operation 1004, threshold criteria are established by which the data points are assigned into data bands based on the analysis criteria. For example, the number of points in the neighborhood of a data point under scrutiny as defined by the mask is assigned to a data band corresponding to different numbers of neighboring points. In operation 1006, the next band, which is the first band on the initial iteration, is selected to apply to the point cloud. In operation 1008, the mask is positioned at the next data point in the current state of the point cloud, which is the first data point on the initial iteration, such that the next data point is in the analysis cell of the mask. The state of the point cloud changes as points are removed therefrom in later operations. In operation 1010, the number of points that are located in include cells 610 are counted and, in operation 1012, it is determined whether that number of data points meets the threshold criterion for the current data band. If the threshold criterion is met, SBD process 716 transitions to operation 1014 where the index of the data point in the analysis cell of the mask the data to a data structure for collecting such for the current data band. Additionally, the data point in the analysis cell mass is removed from the point cloud in operation 1016. If, however, in operation 1012 is determined that a number of data points counted does not meet the threshold criteria for the current data band, a SBD process 716 transitions to operation 1020, where it is determined whether last data point and the point cloud has been analyzed by the mask. If not, SBD process 716 returns to operation 1008 the next data point is positioned in the analysis cell with the mask. If the last data point has been evaluated by the current band as determined in operation 1020, it is determined whether point cloud has been analyzed for all data bands. If not, SBD process 716 returns to operation 1006 where the next band is selected for analysis.

Figure 11:
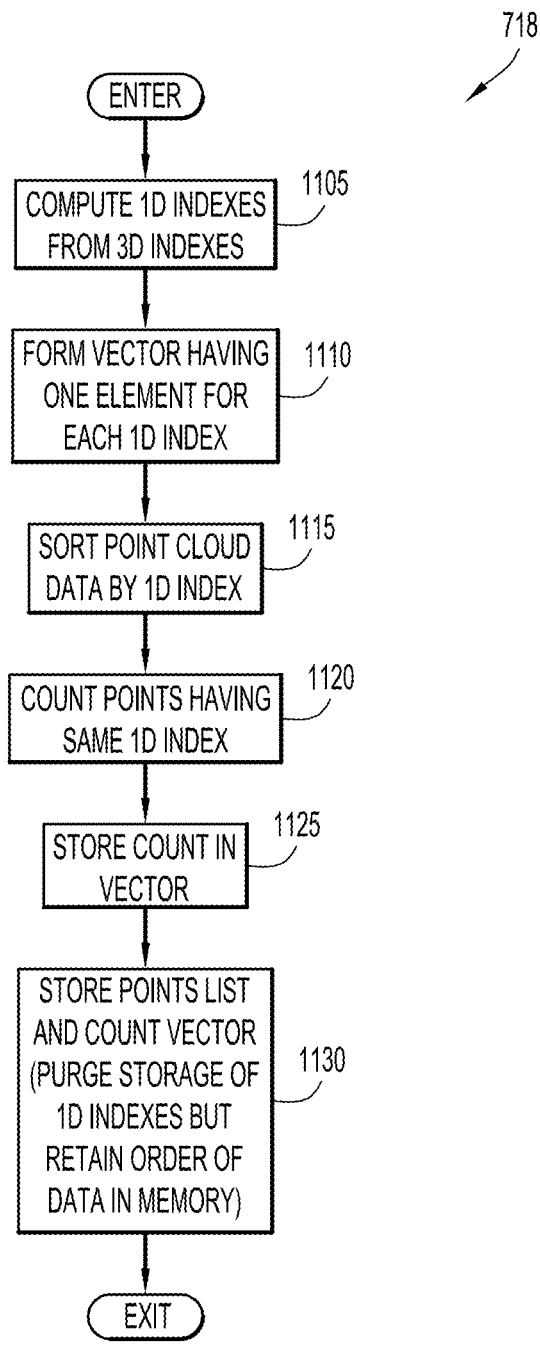
FIG. 11 is a flow diagram of an exemplary index transformation process for implementation in embodiments of the present general inventive concept.

FIG. 11 is a flow diagram of an exemplary index transformation process 718 for implementation in embodiments of the present invention. In operation 1105, linear indexes are generated from the three-dimensional indexes produced by MRG. In operation 1110, a vector is allocated to have one storage location for each possible one dimensional index. In operation 1115, the linearly-indexed data points are sorted by index from smallest to largest and in operation 1120, all points having the same index are counted. In operation 1125, the point count is stored in the allocated vector at a storage location therein that corresponds to the linear index value of the cell. In operation 1130, the sorted data are stored in a points list with the point count vector, but without the cell index information. The order of the data in the points list and points count vector is retained and the original cell indexes can be recovered from this order.

Figure 12:
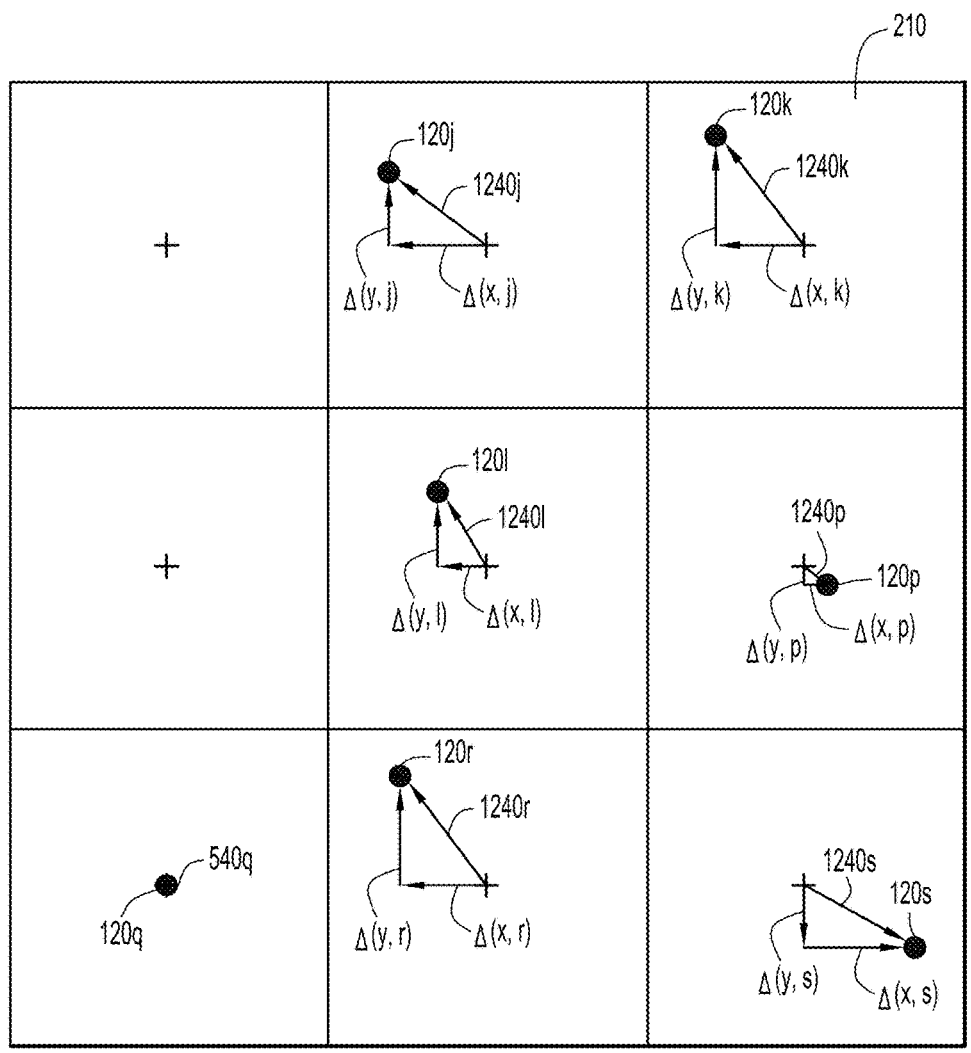
FIG. 12 is a diagram of cells to explain compression using principles of the present general inventive concept.

By the foregoing techniques, scalable compression may be achieved on unformatted and/or arbitrarily distributed data, such as point cloud data. The data may be indexed, such as by MRG, and the indexed data may be decomposed into relevancy bands by SBD. Fewer than all of such bands may by provided as an option to providing the full data set, and the number of bands can be selected in accordance with amount of detail desired. Additionally and/or optionally, redundancies in the data may be created, such as through SDRT and/or index transformation, and such redundancies can be exploited to reduce the number of symbols required to represent the point cloud. Such redundancies can also be utilized in conventional compression schemes where a certain amount of quantization error is tolerable. For example, FIG. 12 is an expanded view of a subset of cells 210 illustrated in FIG. 2. Data points 120 in each data cell 210 are located relative to the center thereof by respective local location vectors 1240$j$-1240$s$, representatively referred to herein as local location vector(s) 1240, such as by SDRT. As illustrated in the figure, each local location vector 1240 may be decomposed into respective vector components $\Delta(x, j\text{-}s)$, $\Delta(y, j\text{-}s)$ and $\Delta(z, j\text{-}s)$, which is orthogonal to the drawing sheet of FIG. 12. The following discussion will be limited to $\Delta(x, j\text{-}s)$ and $\Delta(y, j\text{-}s)$; the three-dimensional operations being analogous to the two-dimensional operations.

It is to be noted that various of the component vectors $\Delta(x, j\text{-}s)$, $\Delta(y, j\text{-}s)$ are of equal magnitude to within a specified equivalency criterion, such as being within a number of length units, and can be identified by quantized lengths L, for example:

$$L(y,1) \equiv |\Delta(y,a)| \approx |\Delta(y,c)| \approx |-\Delta(y,g)|$$

$$L(x,1) \equiv |\Delta(x,b)| \approx |\Delta(x,f)|$$

$$L(x,2) \equiv |\Delta(x,e)| \approx |\Delta(x,d)|$$

As stated above, a consequence of SDRT is that all of these component vectors are within one-half the cell size and by the equivalency criterion, the point cloud can be defined as a collection of symbols indicated by a quantized length L.

Figure 13:
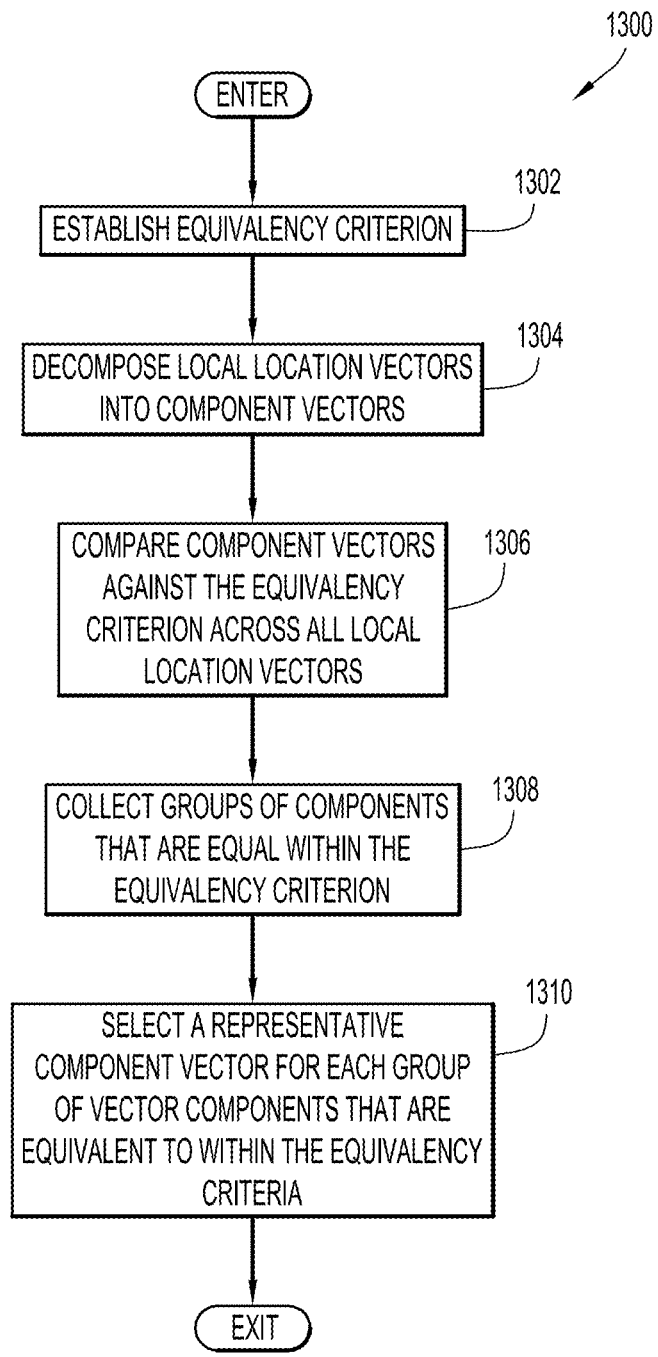
FIG. 13 is a flow diagram of point cloud compression achieved on different scales in accordance with the present general inventive concept.

FIG. 13 is a flow diagram of an exemplary compression process 1300 for implementation in embodiments of the present invention. In operation 1302, a redundancy criterion is established, that when met, indicates that local location vector components are equal in magnitude to within that criterion. In operation 1304, the local location vectors are decomposed into such vector components and are compared with the redundancy criterion in operation 1306. In operation 1308, local location vector components that are equivalent in magnitude to within the redundancy criterion are collected in groups and, in operation 1310, a local location vector component is selected to represent the group. This representative a vector component may be used as a symbol in a compression scheme.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. An apparatus comprising:
   a memory to:
     store point cloud data comprising data points indicative of coordinates thereof with respect to an origin of a coordinate system, the coordinates of the data points being arbitrarily distributed with respect to the origin of the coordinate system; and
   a processor communicatively coupled to the memory and configured to:
     define cells in the point cloud data such that the data points thereof are encompassed by the cells;
     define local coordinate systems in the respective cells, each local coordinate system having a local origin with coordinates relative to the origin of the coordinate system;
     map the coordinates of the data points relative to the origin into coordinates relative to the local origins of the respective local coordinate systems defined in the associated cells;
     determine a cell index for each of the data points uniquely identifying the cells in which the respective data points are contained;
     associate the mapped coordinates of the data points with the indexes of the corresponding data points; and
     store the indexed data points in a memory.

2. The apparatus of claim 1, wherein the processor is further configured to determine the cell index by:

normalizing the coordinates of each of the data points by corresponding dimensions of the cells; and forming the cell index from integer parts of the normalized coordinates of each of the data points.

3. The apparatus of claim 1, wherein the processor is further configured to:

map the coordinates of the data points by subtracting the coordinates of the local origin of the local coordinate system from the coordinates of the data points.

4. The apparatus of claim 3, wherein the local origins of the local coordinate systems are established at the center of the respective cells.

5. The apparatus of claim 1, wherein the processor is further configured to:

decompose the coordinates of the mapped data points into distance measures along each axis of the local coordinate systems;

establish an equivalency criterion within which the distance measures are comparatively equivalent;

compare the distance measures corresponding to respective axes of the local coordinate systems location vectors; and select a distance measure to represent the distance measures that are comparatively equivalent in accordance with equivalency criterion.

6. The apparatus of claim 1, wherein the processor is further configured to:

establish an analysis mask by which the data points within the span of the mask are evaluated against analysis criteria;

establish threshold criteria to separate the data points into a plurality of data bands;

apply the analysis mask to the data points to obtain a measure of the analysis criteria thereat;

compare the measure of the analysis criteria with the threshold criteria; and assign the data points to the data bands in accordance with the comparison of the measure of the analysis criteria with the threshold criteria.

7. The apparatus of claim 6, wherein the analysis criteria is a number of data points in a predetermined neighborhood of one of the data points at which the mask is applied.

8. The apparatus of claim 7, wherein the threshold criteria are thresholds on the number of the data points in the neighborhood of the data point at which the mask is applied for each of the data bands.

9. The apparatus of claim 7, wherein the processor is further configured to:

increment an index counter;

apply the analysis mask at one of the data points that having an index equal to the index counter; and repeat the incrementing and the applying until all of the data points have been assigned to at least one of the data bands.

10. The apparatus of claim 1, wherein the processor is further configured to:

count the number of the data points contained in each of the cells;

map the cell indexes to linear indexes;

sort the data points in an order corresponding to a predetermined order of the linear indexes;

store the count of the number of data points in a vector at a location thereof corresponding to the sorting order of the data points;

store a zero in the vector in all locations thereof corresponding to empty cells indexed in the sorting order of the linear indexes; and store the sorted data points and the vector in a memory.

11. A method comprising:

receiving point cloud data comprising data points indicative of coordinates thereof with respect to an origin of a coordinate system, the coordinates of the data points being arbitrarily distributed with respect to the origin of the coordinate system;

defining cells in the point cloud data such that the data points thereof are encompassed by the cells;

defining local coordinate systems in the respective cells, each local coordinate system having a local origin with coordinates relative to the origin of the coordinate system;

mapping the coordinates of the data points relative to the origin into coordinates relative to the local origins of the respective local coordinate systems defined in the associated cells;

determining a cell index for each of the data points that uniquely identifies the cells in which the respective data points are contained;

associating the mapped coordinates of the data points with the indexes of the corresponding data points; and storing the indexed data points in a memory.

12. The method of claim 11, wherein determining the cell index comprises:

normalizing the coordinates of each of the data points by corresponding dimensions of the cells; and forming the cell index from integer parts of the normalized coordinates of each of the data points.

13. The method of claim 11, wherein mapping the coordinates comprises:

subtracting the coordinates of the local origin of the local coordinate system from the coordinates of the data points.

14. The method of claim 11 further comprising:

establishing an analysis mask by which the data points within the span of the mask are evaluated against analysis criteria;

establishing threshold criteria to separate the data points into a plurality of data bands;

applying the analysis mask to the data points to obtain a measure of the analysis criteria thereat;

comparing the measure of the analysis criteria with the threshold criteria; and assigning the data points to the data bands in accordance with the comparison of the measure of the analysis criteria with threshold criteria.

15. The method of claim 14, wherein the analysis criteria is a number of data points in a predetermined neighborhood of one of the data points at which the mask is applied.

16. The method of claim 14 further comprising:

incrementing an index counter;

applying the analysis mask at one of the data points that having an index equal to the index counter; and repeating the incrementing and the applying until all of the data points have been assigned to at least one of the data bands.

17. The method of claim 11 further comprising:

counting the number of the data points contained in each of the cells;

mapping the cell indexes to linear indexes;

sorting the data points in an order corresponding to a predetermined order of the linear indexes;

storing the count of the number of data points in a vector at a location thereof corresponding to the sorting order of the data points;

storing a zero in the vector in all locations thereof corresponding to empty cells indexed in the sorting order of the linear indexes; and storing the sorted data points and the vector in a memory.

18. A tangible, non-transient computer-readable medium having encoded thereon processor instructions that, when executed by a processor, configures the processor to:

receive point cloud data comprising data points indicative of coordinates thereof with respect to an origin of a coordinate system, the coordinates of the data points being arbitrarily distributed with respect to the origin of the coordinate system;

define cells in the point cloud data such that the data points thereof are encompassed by the cells;

define local coordinate systems in the respective cells, each local coordinate system having a local origin with coordinates relative to the origin of the coordinate system;

map the coordinates of the data points relative to the origin into coordinates relative to the local origin of the respective local coordinate systems defined in the associated cells;

determine a cell index for each of the data points that uniquely identifies the cells in which the respective cells are contained;

associate the mapped coordinates of the data points with the indexes of the corresponding data points; and store the indexed data points in a memory.

19. The computer-readable medium of claim 18, wherein the processor instructions configure the processor to determine the cell index by:

normalizing the coordinates of each of the data points by corresponding dimensions of the cells; and forming the cell index from integer parts of the normalized coordinates of each of the data points.

20. The computer-readable medium of claim 18, wherein the processor instructions configure the processor to:

establish an analysis mask by which the data points within the span of the mask are evaluated against analysis criteria;

establish threshold criteria to separate the data points into a plurality of data bands;

apply the analysis mask to the data points to obtain a measure of the analysis criteria thereat;

compare the measure of the analysis criteria with the threshold criteria; and assigning the data points to the data bands in accordance with the comparison of the measure of the analysis criteria with threshold criteria.

21. The computer-readable medium of claim 20, wherein the processor instructions configure the processor to:

increment an index counter;

apply the analysis mask at one of the data points that having an index equal to the index counter; and repeat the incrementing and the applying until all of the data points have been assigned to at least one of the data bands.

* * * * *